Jan. 16, 1968  J. DELARUELLE ET AL  3,363,301
METHOD OF FILLING OR SEALING JOINTS BETWEEN PIPE SECTIONS
Filed Dec. 10, 1964  2 Sheets-Sheet 2
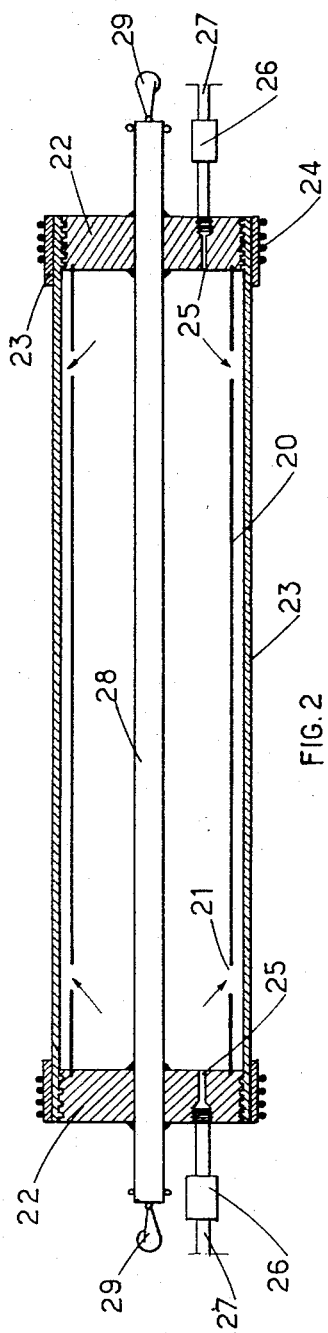
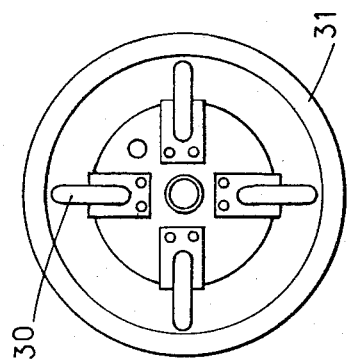
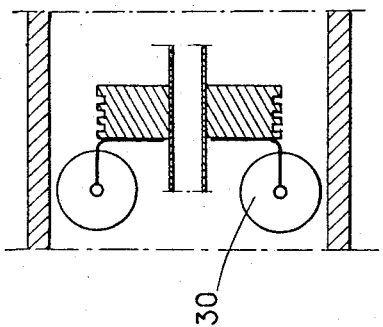
INVENTORS
JACQUES DELARUELLE
JACQUES LE CORRE
By Irwin S. Thompson
ATTY.

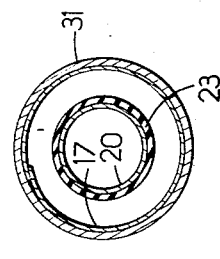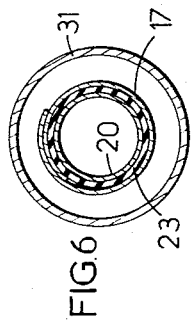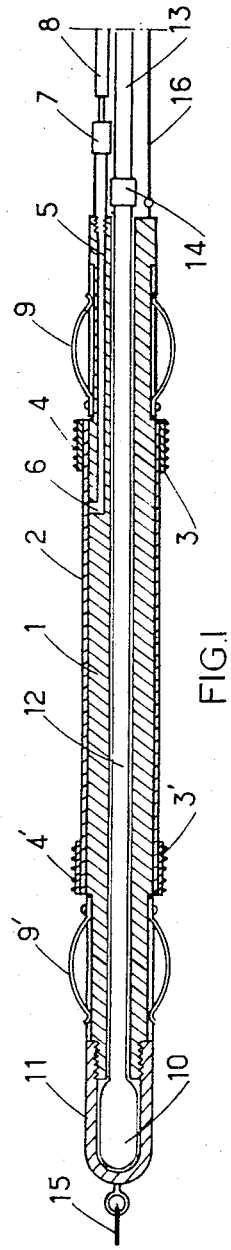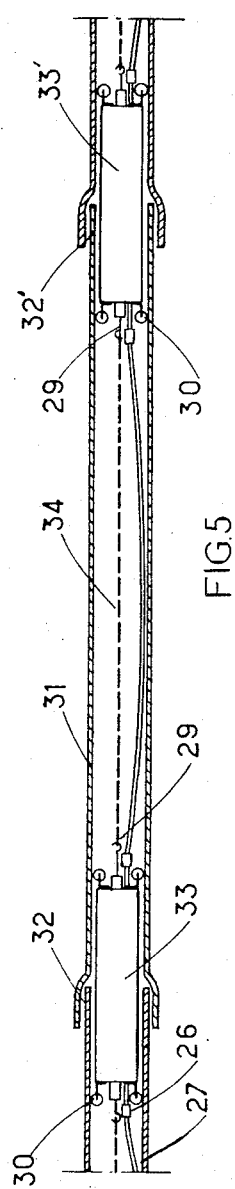

3,363,301
METHOD OF FILLING OR SEALING JOINTS BETWEEN PIPE SECTIONS

Jacques Delaruelle, 16 Rue Chardon-Lagache, Paris, and Jacques Le Corre, 34 Rue-du Docteur Bauer, Saint-Ouen, France
Continuation-in-part of application Ser. No. 112,914, May 26, 1961. This application Dec. 10, 1964, Ser. No. 417,409
3 Claims. (Cl. 29—157)

This application is a continuation-in-part of our copending application Ser. No. 112,914, filed May 26, 1961, now abandoned.

Our invention has for its object a method of filling or sealing joints between pipe sections, chiefly in gas-feeding pipe lines, said method and apparatus being applicable both for the repair and for the execution of such joints.

Our invention has for its object to fill or seal or repair such joints through the agency of strips of a sealing material incorporating a substance having a resinous base, which strips are urged from the inside of the pipe into the space formed by the joint, by an inflatable and expansible strip-carrying support, preferably of rubber, said support being inflated in registry with the joint so as to urge said strip towards the joint.

According to our invention, the strip filling the joint is constituted by a thin strip of a ductile metal or alloy. The metal to be used may be, for instance, copper, lead or the like, but, preferably, aluminum or an aluminum alloy, the thickness of the aluminum or the like strip being advantageously of the order of one or a few tenths of a millimeter, said thickness increasing with the diameter of the pipe.

Said metal strips are coated throughout the surface which is to engage the inner surface of the pipe with a synthetic resin such as, for instance, a polymerizable epoxide resin or else, a polyester, of which certain grades retain their plasticity after polymerization.

The polymerization is obtained as well known in the art in the presence of catalysts and accelerators.

The operator entrusted with the coating of the aluminum strips proportions the mixture so as to obtain the desired consistency as required by the temperature of the room.

In order to further the adherence between the resin and the metal, the surface of the latter should be dulled before application of the resin over it.

The strips of aluminum or the like metal thus prepared are wound very easily around a joint-filling device comprising an inflatable carrier sleeve and slide readily therewith inside the pipe, the joints of which are to be filled in. The strips are yielding and readily match the uneven inner surfaces of the cast iron pipe and of the joints; they are perfectly watertight and have excellent resistance to the action of any condensed water flowing through the pipe.

The aluminum or aluminum alloy is readily released with reference to the rubber sleeve at the moment of the retraction or deflation of the joint-filling apparatus and, since, by reason of its plasticity, the aluminum strip remains suitably applied over the inner surface of the tube, it is possible to remove in practice the inflatable sleeve after one or two minutes, that is, the time required for a fraction of the joint-engaging resin layer to enter the empty space formed by the joint, and to endow the latter with further fluidtightness.

Thus, the wound aluminum strip plays three parts, to wit, it serves as a support for the resin filling or sealing the joint and it allows application of the latter onto the joint surface, once the strip has been positioned; it holds the filling or sealing substance fast and prevents it from flowing back before it has been polymerized; lastly, the aluminum sleeve adheres to the polymerized substance and forms thus a further and lasting protection.

In practice, it is possible in particular to repair joints according to two different procedures.

The first procedure consists in repairing each joint separately. The device for filling in or sealing the joints with our improved packing includes, for instance, and as already described, an inflatable sleeve over which is fitted the metal strip which is adapted to provide the backing for sealing the joint, while one of the ends of the device carries an eletcronic probe of any known type, such as one of those which serve for detecting the defects in metal and which signal its passage across a joint through the illumination of a lamp or the release of an acoustic signal, for instance. It is then sufficient to shift the device over a distance equal to the spacing between the center of the probe and the middle of the aluminum strip so that the latter may lie exactly in registry with the location of the joint. Pressure is then applied inside the device so as to obtain adherence of the coated strip; this operation being executed, the device is removed from the pipe, a further strip of aluminum is positioned and the operation is begun over again until all the joints have been sealed.

The device is connected advantageously at one of its ends with a supply of compressed air and an electronic detector, while its other end carries a cable or rope adapted to control its shifting inside the pipe.

The method just described eliminates any preliminary marking of the joints. It is also possible, starting from a single opening in the pipe line, to fill in in alternation the joints in the two sections of the pipe line lying to either side of said opening, whereby much time may be saved, the period of subjection of a device engaging a joint to the action of pressure on one side corresponding substantially to the time required for removing another device from the section on the other side of the opening and for returning it with the strip to be fitted in position.

Of course, before any operation is performed, it is necessary to clean the pipe by scavenging and by making a gauge pass through it, so as to eliminate any risk of the device catching the pipe surface.

According to the second procedure referred to, all the joints are filled in series. To this end, the positions of the joints are first defined after the passage of a flue brush and of a gauge, the joints are marked by means of an electronic probe or detector of the same type as that referred to precedingly and the point of the pulling cable passing out of the pipe is carefully marked on said cable each time a joint is detected. It is thus easy to return the cable to the position thus marked, whereby the device lies of necessity in front of the joint. If, after the detector has been removed, the spacing between the joints is measured on the cable, it is possible to introduce into the pipe line a series of devices which are automatically positioned in registry with the different joints, as provided by the previous marking of the cable.

In this latter case, each elementary device is provided at each end with a high speed connection which allows interconnecting a series of devices and feeding them with compressed air; furthermore each end of the device is adapted to engage an element of a chain, cable or the like, the length of which corresponds to the distance between the corresponding joints. The whole series of devices is held tensioned inside the pipe line through the agency of such chains, for instance, while the connections feeding compressed air are inoperative during the tensioning periods.

It is preferable to provide two series of devices, of which one is operatively positioned in the pipe line, while the second series of devices is being fitted with aluminum strips.

We will now describe, by way of example and by no means in a limiting sense, two embodiments of the device for the execution of our invention. In accordance with the first embodiment, the device is adapted to fill or seal the different joints in succession, while the second embodiment relates to a device for filling or sealing the joints simultaneously.

In the drawings:

FIG. 1 is a longitudinal cross section of a device for the individual filling or sealing of the joints.

FIG. 2 is a corresponding cross section of a device for the simultaneous filling or sealing of the joints.

FIG. 3 is a side view of an arrangement for making the device roll inside the pipe line.

FIG. 4 is a corresponding cross section of a pipe showing the rolling arrangement in position therein.

FIG. 5 shows, on a smaller scale, the assembly of a plurality of similar devices according to FIG. 2 for the simultaneous filling of several joints.

FIGS. 6, 7 and 8 show the sequence of operation in urging the strips against the joints.

In FIG. 1, 1 designates the tubular body of the device, said body being made of plastic material and carrying an outer rubber sleeve 2 which is held fast and secured over the ends of the body by reinforcements 3 and 3' which are clamped over it by iron collars or wires 4 and 4'.

A channel 5 formed inside the body 1 and opening through the port 6 into the outer surface of the said body 1 inside the sleeve 2, allows inflation of said sleeve. The channel 5 communicates at its end opposed to the port 6 through a connection 7 with a rubber hose 8 supplied with compressed air. Beyond each end of the sleeve 2, the body 1 carries elastic shoes 9 and 9' adapted to engage elastically the inner surface of the pipe line of which the joints are to be filled, so as to allow the device to slide coaxially inside said pipe line. The diameter of the device is, as a matter of fact, less by 32–40 mm. or thereabouts than the diameter of the pipe, so as to prevent any friction between the aluminum strips and the inner surface of the pipe line. One end of the device carries a casing of plastic material 11 for an electronic probe including as an extension a copper tube 12 housed inside the body 1 and containing connecting wires leading to a detector 10. Said wires pass through a sheath of plastic material 13 connected with the tube 12 through a junction box 14. 15 and 16 designate draw cables secured to the device and which allow shifting the latter in either direction inside the pipe line.

It is possible to design, in accordance with the same principle, modified devices, the operation of which would be identical, while, for instance, the elastic shoes are replaced by rollers carried by springs and/or the probe may have a different shape.

The operation of the device is as follows:

Around the rubber sleeve 2 is wound an aluminum strip 17 in a convolute wind with overlapping edges extending lengthwise of the sleeve, the thickness of which is equal to 1 or a few tenths of a millimeter and the length of which covers most of the length of sleeve 2. The aluminum used for this purpose may be constituted by smooth white 99% pure annealed aluminum or, if required, we may use an aluminum alloy. The strip is previously coated on its inner side with a silicone fat or with talcum powder or the like substance allowing an easy release of the aluminum strip with reference to the sleeve. Said aluminum strip which has been previously dulled or roughened is furthermore coated on the other or outer side with a polymerizable resin adapted to ensure adherence of the aluminum strip with the joint and to fill or seal the joint. Said resin is constituted, for instance, by an unsaturated polyester prepared by starting from divalent alcohols having a long chain and from diacids such as malic anhydride and phthalic anhydride. The polymerization reagent may be constituted by styrene and the polymerization may be performed through the agency of conventional organic peroxides and accelerators. Or polyurethanes, comprising the reaction products of polyols and polyisocyanates, may be used. After the strip has been wound over the rubber sleeve, it remains naturally in position over the latter, but, in order to prevent its sliding over the latter during the pull exerted inside the pipe line, it is held fast by means of a few convolutions of a sewing thread, which thread breaks, of course, as soon as the sleeve is inflated.

It is convenient to apply the resin to the strip 17 by saturating or coating both sides of a strip of burlap or the like with the resin, and then applying the burlap to strip 17. In this way, a desirable thick coating of resin, say, one-eighth inch in thickness may be applied.

After the draw cable 15 has been fed through the pipe line in which the joints are to be filled in, the device is introduced into said pipe line through the end carrying the probe and it is pulled out by an operator standing at the remote end of the pipe line through the agency of the cable 15, while the end of the device opposed to the probe is provided with the other cable 16.

Each time the probe registers with a joint, a lamp is ignited and a bell rings. Under such conditions, it is an extremely easy matter to locate the positions of the joints. When the probe is in registry with a joint to be detected, the device is caused to continue its progression by a predetermined distance, say an inch or the like, so that the middle of the sleeve may lie just in registry with the joint.

At this moment, the operator watching the detector opens the valve closing a container of compressed air connected with the pipe 8, so that the sleeve is immediately inflated; the operation is performed under a pressure of about 35 or 40 p.s.i.g. and the sleeve is held under pressure for one or two minutes.

Upon inflation, the aluminum strip 17 expands and its two ends slide over one another so that said strip engages through its resin-coated surface the inner surface of the pipe line, the joints of which are to be filled or sealed, said engagement being provided to either side of the joint registering with the strip. At the same time, a portion of the resin enters the recess in the joint under the pressure thus applied. The length of the strip winding is such that after the device has been inflated until the outer diameter of the winding has become equal to the inner diameter of the pipe line, there remains an overlapping of its convolutions by an inch or so. Lastly, the compressed air is exhausted through a system of cocks of a suitable design; the rubber sleeve returns to its starting position, and the device is removed leaving the applied strip behind, in place on the joint, so as to allow the application of a further strip of aluminum in registry with a further joint.

The operation is thus executed on the joints in succession beginning with the most remote joint. The longest time interval required corresponds to the introduction and to the removal of the device; for instance, with a pipe section of about 250 feet corresponding to about 60 joints, the device will have travelled during one day's work over 15,000 feet.

In another embodiment of our invention, the joints are all filled in simultaneously, as already described.

To this end, a number of devices are used, each of which is constructed in a somewhat different manner and is constituted, as shown in FIG. 2, by a tubular member 20 provided with perforations 21 and closed at its ends by plugs 22 welded to the tubular member, while the sleeve 23 is clamped over said plugs in a manner similar to that described with reference to FIG. 1 through the agency of reinforcements 24. The inside of the tubular member 21 communicates through ports 25 with the connections 26 feeding compressed air, said connections being adapted to open into flexible pipes 27. 28 designates a central tube carrying at each end a snap hook 29 through which the device considered is connected with the adjacent device, through the agency of chains, for instance. The front and the rear of the devices which have just been described are carried by rollers 30 which have not been illustrated in FIG. 2, but are shown clearly in FIGS.

3 and 4, together with the means securing them to the plugs 22. Said rollers 30, the number of which is equal to four for instance (FIG. 4), are spaced by an amount such as will allow the device to run readily inside the pipe 31, as illustrated in FIG. 4.

FIG. 5 illustrates very diagrammatically and on a larger scale a system including a plurality of elementary devices such as that illustrated in FIG. 2, with a view to simultaneously filling or sealing several joints. In said FIG. 5, two devices and two joints only have been illustrated but, of course, in practice, a larger number will be provided. Said FIG. 5 shows inside the pipe 31 provided with the joints 32 and 32′, devices 33 and 33′, of the type illustrated in FIG. 2, resting on rollers 30, as shown in FIG. 4. Said devices are held at the desired spacing by chains 34 engaging the snap hooks 29, while their connections 26 are interconnected by the pipes 27 feeding compressed air.

Previously, and as mentioned hereinabove, it is necessary to define the location of the joints by means of a probe and to this end the lengths of the chains 34 are adjusted in a manner such that the spacing of the apparatus may correspond to the spacing of the joints. The devices 33 provided with their aluminum strips are then brought exactly into registry with the corresponding joints, as provided through a preliminary marking of the draw cable and the filling or sealing is then proceeded with. It is sufficient, for this purpose, to connect the line of pipes of compressed air 27 with a container feeding compressed air; the sleeves of all the devices 33 are then brought simultaneously under pressure to urge the aluminum strips against the corresponding joints. When the time required for application of the strips has elapsed, it is sufficient to reduce the pressure so that the series of devices may be removed.

FIGS. 6, 7 and 8 show in cross section the sequence of operation of urging the strips against the joints. In FIG. 6, an aluminum strip 17 is shown which is wrapped about the sleeve 23 of the embodiment of FIG. 2. The ends of the strip 17 overlap when the sleeve 23 is in its normal or collapsed position as shown in FIG. 2. FIG. 7 shows the expanded position of the sleeve 23. In this expanded position, the overlapping ends of strip 17 have slid one on the other until the outer periphery of strip 17 is pressed against the inner periphery of pipe 31 at the joint. In this position, the adjacent ends of the strip overlap only about an inch. FIG. 8 shows the next step, in which the sleeve 23 is deflated and collapses and is in position to be removed from the region of the joint, the strip 17 remaining in place on the interior of the pipe 31 at the newly sealed joint thanks to the adhesive on the outer surface of the strip.

In the above examples, only the repair of the joints has been referred to. Now, the method according to our invention may serve as well for filling or sealing joints in new pipe lines when they are being laid. It is thus, for instance, possible to start from cast iron pipe sections which are interconnected mechanically through screwing, or else, flanged joints in order to ensure the mechanical rigidity of the pipe line. The fluidtightness of the joint is ensured thereafter by a sheet of aluminum through the practice of our improved method. In such a case, the operation may be extremely simple, as it is no longer necessary to find the joint. Once a pipe section has been positioned, a device secured to a small channel feeding compressed air is introduced into the pipe section carrying a reference mark so that the device may register with the joint to be filled in. It is then sufficient to subject the sleeve carrying the sheet or strip of aluminum to pressure by means of a container of compressed air connected with said channel.

Obviously, many modifications may be made in the arrangements described without departing from the scope of the invention as defined by the accompanying claims.

We claim:

1. A method for placing a sealing material in joints between sections of pipe lines, comprising covering an expansible sleeve with a ductile plastically deformable metallic strip carrying an adhesive sealing material on the exterior thereof, setting the sleeve in position inside a section of the pipe line with the strip and material thereon in registry with a joint, expanding the sleeve to urge and plastically deform the strip carrying the sealing material into engagement with the joint, contracting the sleeve to leave the strip in position with the sealing material thereon in fluidtight engagement with said joint, and removing the sleeve from the pipe line.

2. A method as claimed in claim 1, wherein the invention consists in that the metallic strip is constituted by a strip of aluminum wound round the sleeve and the ends of which overlap, said strip carrying on the exterior thereof a polymerized adhesive sealing resin.

3. A method as claimed in claim 1, wherein the invention consists in that the thickness of the metallic strip is of a magnitude of one tenth to one half of a millimeter.

References Cited

UNITED STATES PATENTS

| 1,636,243 | 7/1927 | Rasmussen | 25—127 X |
| 2,695,255 | 11/1954 | Avery | 156—287 X |
| 2,763,910 | 9/1956 | Braatelien | 156—294 |
| 2,977,994 | 4/1961 | Xenis | 285—370 X |
| 3,046,601 | 7/1962 | Hubbert et al. | 29—421 |

CHARLIE T. MOON, *Primary Examiner.*